United States Patent [19]

Delprato et al.

[11] Patent Number: 5,192,520

[45] Date of Patent: * Mar. 9, 1993

[54] SYNTHESIS OF ALUMINOSILICATE ZEOLITES OF FAUJASITE STRUCTURE

[75] Inventors: François Delprato, Riedishiem; Jean-Louis Guth, Brunstatt; Frédérique Hoffner, Saint-Amarin; Catherine Zivkov, Narosse, all of France

[73] Assignee: Societe National Elf Aquitaine, Courbevoie, France

[ * ] Notice: The portion of the term of this patent subsequent to Mar. 24, 2009 has been disclaimed.

[21] Appl. No.: 689,032

[22] PCT Filed: Sep. 11, 1990

[86] PCT No.: PCT/FR90/00599

§ 371 Date: May 10, 1991

§ 102(e) Date: May 10, 1991

[87] PCT Pub. No.: WO91/04226

PCT Pub. Date: Apr. 4, 1991

[30] Foreign Application Priority Data

Sep. 13, 1989 [FR] France .................. 89 11949

[51] Int. Cl.$^5$ ............................................. C01B 33/34
[52] U.S. Cl. ............................. 423/702; 423/DIG. 21
[58] Field of Search ............... 423/328, 329, 330, 118; 502/64, 79

[56] References Cited

U.S. PATENT DOCUMENTS

| | | | |
|---|---|---|---|
| 2,882,244 | 4/1959 | Milton | 423/328 |
| 3,130,007 | 4/1964 | Breck | 423/329 |
| 3,306,922 | 2/1967 | Barrer et al. | 423/328 |
| 4,377,502 | 3/1983 | Klotz | 423/329 |
| 4,714,601 | 12/1987 | Vaughan | 423/328 |

FOREIGN PATENT DOCUMENTS

| | | | |
|---|---|---|---|
| 37-106518 | 7/1982 | Japan | 423/329 |
| 1314117 | 4/1973 | United Kingdom | 423/329 |

Primary Examiner—R. Bruce Breneman
Attorney, Agent, or Firm—Burgess, Ryan & Wayne

[57] ABSTRACT

An aluminosilicate gel containing an ST structuring agent whose composition is suitable for crystallization into a zeolite of the faujasite structural family is prepared. The gel then undergoes crystallization in order to form a zeolite precursor which consists of the zeolite containing the ST structuring agent in its cavities and channels, the zeolite being produced through the calcination of the precursor. The ST structuring agent consists of at least one compound from the alkylene polyoxides of formula (1)

$$R-O+C_mH_{2m-1}X-O+_nR' \tag{I}$$

in which R and R', identical or different, each represents H or an alkyl radical in $C_1$ to $C_4$, X designates H or OH, m is equal to 2 or 3 and can differ from one pattern to another, and n is a number from 1 to 12. The zeolites thus obtained have a Si:Al ratio which is greater than 1 and which can go beyond 3, and show a cubic symmetry. The zeolites can be used, directly or after cation exchange, as adsorbants or as catalyst constituents.

28 Claims, No Drawings

SYNTHESIS OF ALUMINOSILICATE ZEOLITES OF FAUJASITE STRUCTURE

BACKGROUND OF THE INVENTION

(1) Field of the Invention

The invention relates to a process for the synthesis of zeolites with an aluminosilicate skeleton belonging to the faujasite structural group. It further relates to the products obtained and to their application in adsorption and catalysis.

(2) Background Art

Zeolites are crystalline tectosilicates. The structures consist of assemblies of $TO_4$ tetrahedra forming a three-dimensional skeleton by sharing oxygen atoms. In zeolites of the aluminosilicate type, which are the most common ones, T denotes tetravalent silicon and trivalent aluminium. The abovementioned three-dimensional skeleton exhibits cavities and channels which have molecular dimensions and accommodate cations compensating the charge deficiency linked with the presence of trivalent aluminium in $TO_4$ tetrahedra, the said cations being generally exchangeable.

As a general rule, the composition of zeolites may be denoted by the empirical formula $(M_{2/n}O.Y_2O_3.xZO_2)$ in the dehydrated and calcined state. In this formula Z and Y denote the tetravalent and trivalent elements of the $TO_4$ tetrahedra respectively, M denotes an electropositive element of valency n, such as an alkali metal or alkaline earth metal, and constitutes the compensating cation, and x is a number which can vary from 2 to theoretically infinity, in which case the zeolite is a silica.

Each type of zeolite has a distinct microporous structure. The variation in the dimensions and shapes of the micropores from one type to another results in changes in the adsorbent properties. Only the molecules which have certain dimensions and shapes are capable of entering the pores of a particular zeolite. Because of these remarkable characteristics, zeolites are very particularly suitable for the purification or separation of gaseous or liquid mixtures, such as, for example, the separation of hydrocarbons by selective adsorption.

The chemical composition, including in particular the nature of the elements present in the $TO_4$ tetrahedra and the nature of the exchangeable compensating cations, is also an important factor involved in the selectivity of the adsorption, and above all in the catalytic properties of these products. They are employed as catalysts or catalyst supports in the cracking, reforming and modification of hydrocarbons, and in the conversion of many molecules.

Many zeolites exist in nature; these are aluminosilicates whose availabilities and properties do not always correspond to the requirements of industrial applications. Consequently, the search for products which have new properties has led to the synthesis of a large variety of zeolites, among which there may be mentioned zeolite A (U.S. Pat. No. 2,882,243), zeolite X (U.S. Pat. No. 2,882,244) and zeolite Y (U.S. Pat. No. 3,130,007).

Zeolites of the faujasite structural group are characterised by a three-dimensional skeleton structure which can be described by means of the assembly of modules called cube-octahedra. Each of these modules consists of 24 tetrahedra containing the elements Si and Al in our case and bridged by oxygen according to the principle described above. In the cube-octahedron, the tetrahedra are linked so as to form eight rings containing six tetrahedra and six rings containing four tetrahedra.

Each cube-octahedron is joined, with tetrahedral coordination, via four rings containing six tetrahedra, to four neighbouring cube-octahedra.

To show the relationships which unite the various members of the structural group it is convenient to consider the structural planes in which the cube-octahedra are arranged at the vertices of a plane network of hexagons. Each cube-octahedron is thus connected to three neighbours in the structural plane.

The fourth connecting direction is directed alternately on each side of the structural plane and enables the cube-octahedra to be connected between neighbouring and parallel structural planes.

All the solids belonging to the faujasite structural group have interconnected channels approximately 0.8 nm in diameter. Thus, faujasite is a zeolite with an aluminosilicate skeleton whose structure corresponds to the stacking of three distinct structural planes ABC corresponding to a structure of cubic symmetry.

Compounds of the same structure as faujasite can be obtained by synthesis from an aluminosilicate gel.

The general process of synthesis of zeolites with an aluminosilicate skeleton belonging to the faujasite structural group consists of a hydrothermal crystallisation of sodium aluminosilicate gels of particular compositions and containing a structuring agent consisting of a metal cation.

More precisely, a process of this kind consists in producing first of all a reaction mixture which has a pH higher than 10 and contains water, a source of tetravalent silicon, a source of trivalent aluminium, a source of hydroxide ions in the form of a strong base, a source of $M^{n+}$ metal cations, n being the valency of M, so as to obtain an aluminosilicate gel which has the desired composition to permit its crystallization into a compound of the faujasite structural group, and in then maintaining the gel obtained directly or after prior maturing, at a temperature not exceeding 150° C. and at a pressure which is at least equal to the autogenous pressure of the mixture consisting of the said gel for a sufficient period to effect the crystallisation of this gel.

As indicated earlier, a process of this kind does not make it possible to synthesise zeolites with an aluminosilicate skeleton having the faujasite structure of cubic symmetry and an Si/Al ratio higher than 3.

It has now been found that certain organic molecules belonging to the class of polyalkylene oxides have the property of directing the crystallization of aluminosilicate gels towards zeolites of the faujasite structural group, which are characterised by Si/Al ratios which may be higher than 3. These molecules introduce a pronounced stabilising effect which makes it possible to decrease the concentration of the hydroxide ions in the synthesis medium, which results in obtaining a higher Si/Al ratio and a substantial improvement in the yield.

SUMMARY OF THE INVENTION

The subject of the invention is therefore a process for the preparation of zeolites with an aluminosilicate skeleton belonging to the faujasite structural group and exhibiting an Si/Al ratio higher than 1 and capable of exceeding 3. The process is of the type in which a reaction mixture is produced first of all, which has a pH higher than 10 and contains water, a source of tetravalent silicon, a source of trivalent aluminium, a source of hydroxide ions in the form of a strong base and a structuring agent ST, so as to obtain an aluminosilicate gel which has the desired composition to permit its crystallization into a compound of the faujasite structural group. The gel obtained is then maintained, optionally after prior maturing, at a temperature not exceeding 150° C. and at a pressure which is at least equal to the autogenous pressure of the mixture consisting of the said gel for a sufficient period to effect the crystallization of this gel into a precursor of the zeolite consisting of the zeolite trapping the structuring agent ST in its cavities. The said precursor is subjected to a calcination to destroy the structuring agent and to produce the zeolite, and it is characterised in that the structuring agent ST consists of at least one compound chosen from the polyalkylene oxides corresponding to the formula

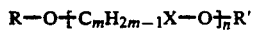

in which each of R and R', which are identical or different, denotes a hydrogen atom or a $C_1$-$C_4$ alkyl radical, X denotes a hydrogen atom or an —OH radical, m is equal to 2 or 3 and may be different from one unit to another and n is a number ranging from 1 to 12.

DESCRIPTION OF THE PREFERRED EMBODIMENTS

The quantity of structuring agent ST present in the reaction mixture intended to form the gel is advantageously such as to make the molar ratio ST : $Al^{III}$ range from 0.1 to 4, the said ratio preferably ranging from 0.1 to 2.

In particular, the ingredients making up the reaction mixture giving rise to the aluminosilicate gel are employed so that the said gel may have, in terms of molar ratios, the following composition:

|  | Advantageous ranges | Preferred ranges |
| --- | --- | --- |
| $Si^{IV}$:$Al^{III}$ | 2 to 20 | 4 to 10 |
| $OH^-$:$Al^{III}$ | 2 to 12 | 3 to 10 |
| ST:$Al^{III}$ | 0.1 to 4 | 0.1 to 2 |
| $H_2O$:$Al^{III}$ | 40 to 200 | 50 to 150 |

Examples of structuring agents corresponding to the formula given above are such as ethylene glycol methyl ether of formula $CH_3OCH_2CH_2OH$, ethylene glycol dimethyl ether of formula $CH_3OCH_2CH_2OCH_3$, ethylene glycol of formula $HOCH_2CH_2OH$, propylene glycol of formula $HOCH_2CH_2CH_2OH$, polyethylene glycol methyl ethers of formula $CH_3$-$\{O$—$CH_2CH_2O$-$\}_n$-H and polyethylene glycols of formula OH-$\{CH_2C$-$H_2O$-$\}_{n'}$-H with n' ranging from 2 to 9, and especially tetraethylene glycol, pentaethylene glycol, hexaethylene glycol, heptaethylene glycol, octaethylene glycol and mixtures of such glycols, polypropylene glycols of formula HO-$\{CH_2CH_2CH_2O$-$\}_{n'}$-H with n' ranging from 2 to 9, and especially tripropylene glycol and tetrapropylene glycol.

The use of structuring agents according to the invention results in the formation of zeolites which have the faujasite cubic symmetry structure.

Among the sources of tetravalent silicon $Si^{IV}$ which can be employed in the preparation of the reaction mixture intended to form the aluminosilicate gel there may be mentioned finely divided solid silicas in the form of hydrogels, aerogels or colloidal suspensions, water-soluble silicates such as alkali metal silicates like sodium silicate, and hydrolysable silicic esters such as tetraalkyl orthosilicates of formula $Si(OR)_4$ in which R denotes a $C_1$-$C_4$ alkyl such as methyl and ethyl.

The source of silicon is used in the form of a true aqueous solution, in the case of water-soluble silicates, or else of an aqueous suspension which may be colloidal, in the case of finely divided silicas.

Suitable sources of trivalent aluminium $Al^{III}$ are aluminium salts such as aluminium sulphate, nitrate, chloride, fluoride or acetate, aluminium oxides and hydroxyoxides, aluminates and especially alkali metal aluminates such as sodium aluminate, and aluminium esters such as aluminium trialkoxides of formula $Al(OR)_3$ in which R denotes a $C_1$-$C_4$ alkyl radical such as methyl, ethyl or propyl.

The source of hydroxide ions is chosen from strong inorganic bases, especially hydroxides of the alkali metals of group IA of the Periodic Classification of the Elements and hydroxides of the alkaline-earth metals Ca, Sr and Ba and strong organic bases, especially quaternary ammonium hydroxides, preference being given to inorganic bases and especially to sodium hydroxide NaOH.

The reaction mixture intended to form the aluminosilicate gel may also contain $M^{n+}$ cations of at least one metal M, of valency n, other than the metals whose hydroxides are strong bases, in an overall quantity such as to make the molar ratio $M^{n+}$ : $Al^{III}$ not more than 0.4 and preferably not more than 0.3. The said $M^{n+}$ cations are introduced into the said reaction mixture in the form of salts such as sulphates, nitrates, chlorides or acetates, or else in the form of oxides.

Mixing of the ingredients constituting the reaction mixture intended to form the aluminosilicate gel may be performed in any order.

The said mixing is advantageously carried out by first of all preparing, at room temperature, a basic aqueous solution containing a strong base, the structuring agent ST and the cations $M^{n+}$ if they are employed, and then incorporating into this solution an aqueous solution of the source of trivalent aluminium and an aqueous solution or suspension, colloidal or otherwise, of the source of tetravalent silicon. The pH of the reaction mixture, whose value is higher than 10, is preferably close to 13.5. Before proceeding to crystallise the gel, crystallization seeds may be added to the reaction mixture intended to form the said gel, in a quantity advantageously ranging from 0.1% to 10% by weight of the reaction mixture.

The seeds may be produced either by grinding a zeolite of the faujasite type, that is to say of the same kind as the crystalline phase to be produced. In the absence of addition of seeds, it is advantageous to subject the aluminosilicate gel formed from the reaction mixture to a maturing operation in a closed vessel, at a temperature below the crystallization temperature for a period which may range from approximately 6 hours to approximately 6 days. The said maturing may be carried out in a static regime or with stirring. The crystallization of the aluminosilicate gel, with or without seed, is carried out by heating the reaction mixture to a temperature not exceeding 150° C. and preferably ranging from 90° C. to 120° C. and at a pressure corresponding at least to the autogenous pressure of the reaction mixture forming the gel. The heating period needed for the crystallization depends on the composition of the gel and on the crystallization temperature. It is generally between 2 hours and 30 days The crystals obtained, referred to as zeolite precursors and consisting of the zeolite trapping the structuring agent and the water of hydration of the cations in its pores and cavities, are separated from the crystallization medium by filtration and are then washed with distilled or deionised water until weakly basic wash liquors are obtained, that is to say whose pH is lower than 9. The washed crystals are then dried in an oven at a temperature of between 50° C. and 100° C. and preferably in the region of 70° C.

The zeolite is obtained from the crystals of the precursor by subjecting the said crystals to a calcination at a temperature above 300° C. and preferably between 400° C. and 700° C. for a sufficient period to remove the structuring agent and the water of hydration of the cations present in the precursor.

As indicated earlier, the zeolites prepared by the process according to the invention have Si/Al ratios higher than 1 and capable of exceeding 3 and have a structure of cubic symmetry of the type of that of faujasite.

The characterisation of the products according to the invention, namely the precursors resulting from the crystallisation and the zeolites proper resulting from the calcination of the precursors, can be performed by employing the following techniques:

Electron microscopy:

In the electron microscope, the products of cubic structure are seen in forms which are compatible with cubic symmetry (for example regular octahedra).

X-ray diffraction pattern:

This diffraction pattern is obtained by means of a diffractometer using the traditional powder method with copper Ka radiation.

An internal standard enables the values of the angles $2\theta$ associated with the diffraction peaks to be determined accurately. The various lattice-spacing distances ($d_{hkl}$) characteristic of the sample are calculated from the Bragg relationship.

The estimate of the error of measurement $\Delta(d_{hkl})$ over $d_{hkl}$ is calculated, as a function of the absolute error $\Delta(2\theta)$ associated with the measurement of $2\theta$, using the Bragg relationship.

In the presence of an internal standard, this error is reduced to a minimum and commonly taken as equal to $\pm 0.05°$. The relative intensity I/Io associated with each $d_{hkl}$ is estimated from the height of the corresponding diffraction peak. A scale of notations is employed to characterise this relative intensity as follows: VS=very strong, S=strong, mS=medium strong, m=medium, nw=medium weak, w=weak, vw=very weak.

Thermogravimetry:

The thermograms performed on the product samples make it possible to quantify the number of molecules of structuring agent and the number of molecules of water which are present in a unit cell of the structure.

Carbon 13 NMR:

Carbon 13 NMR in crossed polarisation with rotation at the magic angle performed on samples of the precursor enables the presence of the structuring agent in the cavities of the product to be confirmed.

Determination of the Si:Al ratio

This can be carried out by resorting to one of the following techniques:

chemical analysis silicon 29 NMR

The zeolites according to the invention of the faujasite type have a cubic structure exhibiting a value of the cubic cell parameter a of between 2.4 and 2.5 nm; these cubic zeolites can be given the following formula reduced to one cell (assembly of 192 tetrahedra)

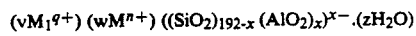

with, in this formula, $M_1^{q+}$ denoting a q-valent cation of a metal of group IA of the Periodic Classification of the elements (q=1) or of an alkaline-earth metal chosen from Ca, Sr and Ba (q=2) or a monovalent cation containing nitrogen (q=1), especially ammonium or quaternary ammonium, $M^{n+}$ denoting a metal cation of valency n other than a cation $M_1^{q+}$, x,z,w and v being numbers such that $38 < x \leq 96$, $z \geq 0$ depending on the hydration state of the zeolite (z=0 for a completely anhydrous zeolite), $0 < v \leq x/q$ and $0 \leq w \leq x/n$ with $qv+wn \leq x$.

Table I below shows the characteristic X-ray diffraction pattern of the cubic zeolites of the faujasite type after the products have been calcined for 4 hours at 500° C.

In the $d_{hkl}$ column, average values of the lattice-spacing distances have been given. Each of these values must be associated with the error of measurement $\Delta(d_{hkl})$ of between $\pm 0.1$ and $\pm 0.004$.

The variations which can be observed in relation to these average values are essentially linked with the nature of the compensating cations and with the Si/Al ratio of the zeolite. The same remarks apply to the relative intensities I/Io.

TABLE I

| $2\theta$ (degrees) | $d_{hkl}(10^{-1}$ nm) | | I/Io |
|---|---|---|---|
| 6.19 | 14.27 | ± 0.2 | VS |
| 10.13 | 8.72 | | mS |
| 11.89 | 7.43 | | mS |
| 15.64 | 5.66 | ± 0.05 | S |
| 18.70 | 4.74 | | mS |
| 20.36 | 4.36 | | mS |
| 22.81 | 3.89 | | vw |
| 23.68 | 3.75 | | S |
| 25.84 | 3.44 | | vw |
| 27.07 | 3.292 | ± 0.008 | mS |
| 27.95 | 3.189 | | w |
| 29.69 | 3.007 | | w |
| 30.77 | 2.903 | | mw |
| 31.44 | 2.843 | | mS |

The precursors of zeolites which are produced during the crystallization stage of the process according to the invention and whose calcination produces the zeolites whose formulae were defined above, are crystalline aluminosilicates exhibiting an Si:Al ratio higher than 1 and capable of exceeding 3, which have the cubic structure of the faujasite corresponding to an X-ray diffraction pattern comparable to that given in Table II and which have cavities trapping molecules of structuring agent ST, which are chosen from polyalkylene oxides whose formula has been defined above.

TABLE II

| $2\theta$ (degrees) | $d_{hkl}(10^{-1}$ nm) | | I/Io |
|---|---|---|---|
| 6.24 | 14.13 | ± 0.2 | VS |
| 10.16 | 8.89 | | mS |
| 11.93 | 7.41 | | mS |
| 15.70 | 5.64 | ± 0.05 | S |
| 18.75 | 4.72 | | mS |
| 20.39 | 4.35 | | mS |

TABLE II-continued

| 2θ (degrees) | $d_{hkl}(10^{-1}$ nm) | | I/Io |
|---|---|---|---|
| 22.84 | 3.89 | | w |
| 23.69 | 3.75 | | s |
| 25.05 | 3.55 | | w |
| 25.94 | 3.43 | | w |
| 27.11 | 3.286 | ± 0.008 | s |
| 27.85 | 3.200 | | vw |
| 29.68 | 3.007 | | w |
| 30.77 | 2.903 | | mw |

The zeolites obtained by the process according to the invention can be employed in applications of the same type as the zeolites of similar structure and of comparable or lower Si : Al ratio which are prepared by closely related or different methods.

Thus, the zeolites obtained according to the invention are suitable as an adsorbent for performing the selective adsorption of molecules whose dimensions are below 0.8 nm or else, after having been subjected to exchange reactions with various cations, as catalysts or catalyst components which can be employed in catalytic conversion reactions of organic compounds and especially of hydrocarbon compounds. For example, the protonated form of the zeolite is obtained by an exchange treatment with ammonium cations followed by a calcination. This form, as well as those resulting from an exchange treatment with rare-earth cations such as lanthanum are suitable as acidic catalysts for hydrocracking petroleum feedstocks. The zeolites can also be subjected to exchange treatments with cations of metals of groups II to VIII of the Periodic Classification to form products which are suitable as catalysts for hydrocarbon conversion. For their application as catalysts, zeolites modified by exchange with cations endowing them with catalytic properties may be employed by themselves or in the form of composite products resulting from mixing these modified zeolites with other catalytically active products and/or with an amorphous matrix such as a silica gel or else a mixed gel of silica and of another oxide such as magnesia, alumina, titanium oxide or zirconium oxide, the said matrix being used, inter alia, to impart a better heat stability to the catalyst.

Composite catalysts associating one or more catalytically active zeolites with a matrix based on silica gel or a mixed gel of silica and another oxide are particularly suitable for operations in a moving bed or in a fluidised bed, because they can be easily shaped, for example by spray-drying an aqueous suspension of the ingredients of which they are composed, into particles which have the dimensions required for these operations.

The following examples are given without any limitation being implied, to illustrate the invention.

In these examples, the quantities and percentages are given by weight unless shown otherwise.

EXAMPLE 1

An aluminosilicate gel was prepared first of all by operating as follows in a vessel of appropriate capacity, the contents of the said vessel being kept stirred throughout the operation.

9 parts of water followed by 0.58 parts of sodium hydroxide NaOH were introduced into the vessel and, after the sodium hydroxide dissolved, 1.92 parts of structuring agent consisting of the methyl ether of a polyoxyethylene glycol with a number-average molecular mass Mn equal to 350. After all had dissolved, 1 part of sodium aluminate containing 56% of $Al_2O_3$ and 37% of $Na_2O$ was then added to the contents of the vessel and the reaction mixture was heated slightly to dissolve the aluminate completely.

After returning to room temperature, 8.2 parts of a colloidal suspension of silica containing 40% of $SiO_2$ and 60% of water were then introduced into the vessel.

An aluminosilicate gel was thus obtained, whose molar composition, reduced to one mole of $Al_2O_3$, was the following:

10 $SiO_2$; 1 $Al_2O_3$; 2.4 $Na_2O$; 1 "$PEO_{350}$"; 140 $H_2O$

The abbreviation "$PEO_{350}$" denotes the structuring agent employed.

The gel obtained was subjected to a maturing operation at room temperature for 48 hours in a closed vessel. The matured gel was then placed in an autoclave and kept in the latter at 110° C. for 20 days to form a crystalline product. The crystals formed were separated off from the reaction medium by filtration and were then washed with distilled water to a low basicity (pH below 9) of wash liquors and were finally dried in an oven at approximately 60° C.

The dried crystals were then calcined at 500° C. for 4 hours in order to remove the molecules of the structuring agent employed and to obtain the zeolite.

Before calcination, the crystalline product has an X-ray diffraction pattern comparable to that given in Table II, the said product additionally exhibiting an Si : Al ratio of 3.8 and containing water molecules and molecules of structuring agent in its micropores. The species occluded in the micropores of the zeolite (water and structuring agent) represent 24.7% of the zeolite precursor.

The zeolite formed by calcining the above crystalline product exhibits an X-ray diffraction pattern comparable with that given in Table I.

The formula found for this zeolite, reduced to a cubic cell of 192 tetrahedra is written in the anhydrous state $$41.5\ Na^+[(SiO_2)_{151.8}\ (AlO_2)_{40.2}]^{40.2-}$$

EXAMPLE 2

The procedure was as shown in Example 1, but with the following changes in the operating conditions
gel preparation : 0.49 parts of sodium hydroxide and 3.84 parts of structuring agent (same product as in Example 1)
maturing : 24 hours at 25° C.
crystallisation : 20 days at 110° C.

Before maturing, the aluminosilicate gel had the following molar composition, reduced to 1 mole of $Al_2O_3$:

10 $SiO_2$; 1 $Al_2O_3$; 2.2 $Na_2O$; 2 "$PEO_{350}$"; 140 $H_2O$

Before calcination, the crystalline product has an X-ray diffraction diagram comparable with that given in Table II.

The said product exhibits an Si : Al ratio equal to 4.1 and contains water molecules and molecules of the structuring agent employed in its micropores. The species occluded in the micropores of the zeolite before calcination (water and structuring agent) represent 25.4% of the zeolite precursor.

The zeolite formed by calcining the crystalline precursor product exhibits an X-ray diffraction pattern comparable with that given in Table I.

The formula found for this zeolite, reduced to a cubic cell of 192 tetrahedra, is written in the anhydrous state $$40.2\ Na^+[(SiO_2)_{153.6}\ (AlO_2)_{38.4}]^{38.4-}$$

EXAMPLE 3

The procedure was as shown in Example 1, but with the following changes in the operating conditions
gel preparation : 1.1 parts of structuring agent consisting of the monomethyl ether of a polyethylene glycol of molecular mass Mn equal to 200.
maturing : 24 hours at 20° C.
crystallisation : 12 days at 100° C.

Before maturing, the aluminosilicate gel had the following molar composition, reduced to 1 mole of $Al_2O_3$:

10 $SiO_2$; 1 $Al_2O_3$; 2.4 $Na_2O$; 1 "$PEO_{200}$"; 140 $H_2O$

The abbreviation "$PEO_{200}$" denotes the structuring agent employed.

Before calcination, the crystalline product exhibits an X-ray diffraction pattern comparable with that given in Table II.

This product additionally exhibits an Si : Al ratio of 3.6 and contains water molecules and molecules of the structuring agent employed in its micropores. The species occluded in the micropores of the zeolite ($H_2O$ and structuring agent) represent 25.7% of the zeolite precursor.

The zeolite formed by calcining the above precursor product exhibits an X-ray diffraction pattern comparable with that of Table I.

The formula found for this zeolite, reduced to a cubic cell of 192 tetrahedra, is written in the anhydrous state:

$$43.8\ Na^+[(SiO_2)_{150.3}\ (AlO_2)_{41.7}]^{41.7-}$$

EXAMPLE 4

The procedure was as shown in Example 1, but with the following changes in the operating conditions
gel preparation : 3.3 parts of structuring agent consisting of the monomethyl ether of a polyethylene glycol of molecular mass equal to 300 and 0.53 parts of sodium hydroxide
maturing : 24 hours at 30° C.
crystallisation : 20 days at 110° C.

Before maturing, the aluminosilicate gel had the following molar composition, reduced to 1 mole of $Al_2O_3$:

10 $SiO_2$; 2.3 $Na_2O$; 1 $Al_2O_3$; 2 "$PEO_{300}$"; 140 $H_2O$

Before calcination, the crystalline product exhibits an X-ray diffraction pattern comparable with that in Table II. The said product additionally exhibits an Si : Al ratio equal to 3.8 and contains water molecules and molecules of the structuring agent employed in its micropores. The species occluded in the micropores of the zeolite ($H_2O$ and structuring agent) denote 24.5% of the zeolite precursor).

The zeolite formed by calcining the above precursor product exhibits an X-ray diffraction pattern comparable with that of Table I.

The formula found for this zeolite, reduced to a cubic cell of 192 tetrahedra, is written in the anhydrous state:

$$42.5\ Na^+[(SiO_2)_{151.9}\ (AlO_2)_{40.1}]^{40.1-}$$

We claim:

1. A process for the preparation of a zeolite with an aluminosilicate skeleton belonging to the faujasite structural group and exhibiting an Si : Al ratio higher than 1, said process comprising:
   (a) producing a reaction mixture which has a pH higher than 10 and contains water, a source of tetravalent silicon, a source of trivalent aluminum, a source of hydroxide ions in the form of a strong base and a structuring agent ST, so as to produce an aluminosilicate gel having a composition effective to permit its crystallization into a compound of the faujasite structural group;
   (b) maintaining said gel at a temperature not exceeding 150° C. and at a pressure which is at least equal to the autogenous pressure of the gel for a sufficient period to effect crystallization of this gel into a precursor of said zeolite containing the structure agent ST in its cavities; and
   (c) calcining said precursor to destroy said structuring agent and to produce said zeolite;
wherein the structuring agent ST consists of at least one compound chosen from the polyalkylene oxides corresponding to the formula $$R-O+(C_mH_{2m-1}X-O)_n R'$$

in which each of R and R', which are identical or different, denotes a hydrogen atom or a $C_1$-$C_4$ alkyl radical, X denotes a hydrogen atom or an —OH radical, m is equal to 2 or 3 and may be different from one unit to another and n is a number ranging from 1 to 12.

2. The process according to claim 1 wherein the quantity of structuring agent ST in the reaction mixture has a molar ratio ST:$Al^{III}$ range of from 0.1 to 4.

3. The process according to claim 1, wherein the ingredients making up the reaction mixture giving rise to the aluminosilicate gel are employed in quantities such that the gel has, in terms of molar ratios, a composition such that $Si^{IV}$: $Al^{III}$=2 to 20, $OH^-$ : $Al^{III}$=2 to 12, ST : $Al^{III}$=0.1 to 4 and $H_2O$ : $Al^{III}$=40 to 200.

4. The process according to claim 3, wherein the composition is such that $Si^{IV}$ : $Al^{III}$=4 to 10, $OH^-$: $Al^{III}$=3 to 10 , ST : $Al^{III}$=0.1 to 2 and $H_2O$ : $Al^{III}$=50 to 150.

5. The process according to claim 1, wherein the structuring agent ST consists of at least one compound chosen from the group consisting of $CH_3OCH_2CH_2OH$, $CH_3OCH_2CH_2OCH_3$, $HOCH_2CH_2OH$, $HOCH_2CH_2CH_2OH$, $CH_3$—O—($CH_2CH_2O$—)$_{n'}$—H, HO—($CH_2CH_2O$—)$_{n'}$—H and HO—($CH_2CH_2CH_2O$—)$_{n'}$—H with n' denoting a number ranging from 2 to 9.

6. The process according to claim 1, wherein the source of tetravalent silicon is chosen from the group consisting of finely divided silicas in the form of hydrogels, aerogels or colloidal suspension, water-soluble silicates and hydrolyzable silicic esters.

7. The process according to claim 1, wherein the source of trivalent aluminum is chosen from the group consisting of aluminum oxides and hydroxyoxides, and aluminates.

8. The process according to claim 1 wherein the source of hydroxide ion is chosen from the group consisting of the hydroxides of the alkali metals of group IA of the Periodic Classification of the Elements, the hydroxides of the alkaline-earth metals Ca, Sr and Ba and strong organic bases.

9. The process according to claim 1, wherein the reaction mixture contains cations $M^{n+}$ of at least one metal M, of valency n, other than the metals whose hydroxides are strong bases, in an overall quantity such as to make the molar ratio $M^{n+} : Al^{III}$ in the mixture not more than 0.4.

10. The process according to claim 1, wherein, before the crystallization of the gel takes place, crystallization seeds are added to the reaction mixture intended to form the gel, in a quantity ranging from 0.1% to 10% by weight of the reaction mixture, the crystallization seeds being produced by grinding a zeolite of the same kind as the crystalline phase to be produced.

11. The process according to claim 1, wherein, before crystallization of the gel takes place, the gel is subjected to a maturing operation in a closed vessel, at a temperature below the crystallization temperature for a period ranging from approximately 6 hours to approximately 6 days.

12. The process according to claim 1, wherein the crystallization of the aluminosilicate gel, with or without seed, is carried out by keeping the gel at a temperature ranging from 90° C. to 120° C. for a period of between 2 hours and 30 days.

13. The process according to claim 1, wherein the calcination of the zeolite precursor is carried out at a temperature above 300° C.

14. Precursors of zeolites with an aluminosilicate skeleton belonging to the faujasite structural group, consisting of aluminosilicates which have an Si:Al ratio higher than 1 and which, on the one hand, exhibit a structure of cubic symmetry with that of faujasite and, on the other hand, have cavities or channels containing molecules of at least one structuring agent ST, wherein the structuring agent belongs to the group made up of polyalkylene oxides corresponding to the formula

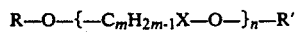

in which each of R and R', which are identical or different, denotes a hydrogen atom or a $C_1$-$C_4$ alkyl radical, X denotes a hydrogen atom or a hydroxyl radical, m is equal to 2 or 3 and may be different from one unit to another and n is a number ranging from 1 to 12.

15. Precursors according to claim 14, wherein the structuring agent ST is chosen from the group consisting of $CH_3OCH_2CH_2OCH_3$, $CH_3OCH_2CH_2OH$, $HOCH_2CH_2OH$, $HOCH_2CH_2CH_2OH$, $CH_3$—O—$(CH_2CH_2O—)_{n'}$—H, HO—$(CH_2CH_2O—)_{n'}$—H with n' denoting a number ranging from 2 to 9.

16. Precursors according to claim 14, wherein they exhibit an X-ray diffraction pattern comparable with that defined in Table II of the specification.

17. A process for the preparation of zeolites with an aluminosilicate skeleton belonging to the faujasite structural group and exhibiting an Si:Al ratio higher than 1 and which comprises calcining the precursors of claim 14, said zeolites being capable of being employed, directly or after cation exchange, as adsorbents or components of catalysts.

18. The process according to claim 17, wherein the zeolites obtained by calcination of the precursors exhibit a value of the parameter a of the cubic cell of between 2.4 and 2.5 nm, have an X-ray diffraction pattern comparable with that given in Table I of the specification and correspond to a formula which, reduced to one cell of the cubic structure, is written

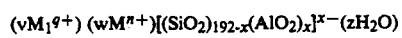

and in which $M_1{}^{q+}$ denotes a q-valent cation of a metal of group IA of the Periodic Classification of the elements (q=1) or of an alkaline-earth metal chosen from Ca, Sr and Ba (q=2) or a nitrogenous monovalent cation (q=1), $M^{n+}$ denotes a cation of at least one metal M of valency n other than a cation $M_1{}^{q+}$, and x, z, v and w are numbers such that $38<x\leq96$, $z\geq0$ and depending on the hydration state of the precursor, $0<v\leq x/q$ and $0\leq w\leq x/n$ with $qv+wn\geq x$.

19. The process according to claim 1 wherein the Si:Al ratio is greater than 3.

20. Precursors of zeolites according to claim 14 wherein the Si:Al ratio is greater than 3.

21. The process according to claim 17, wherein the Si:Al ratio is greater than 3.

22. The process according to claim 2 wherein the molar ratio $ZT:Al^{III}$ is from 0.1 to 2.

23. The process according to claim 9 wherein the molar ratio $M^{n+}:Al^{III}$ is not more than 0.3.

24. The process according to claim 13, wherein the temperature is between 400° C. and 700° C.

25. The process according to claim 6 wherein the water-soluble silicates are alkali metal silicates.

26. The process according to claim 6 wherein the silicic esters are tetraalkyl orthosilicates of formula $Si(OR)_4$ in which R denotes a $C_1$-$C_4$ alkyl radical.

27. The process to claim 7 wherein the aluminates are alkali metal aluminates.

28. The process according to claim 7 wherein the aluminates re aluminum trialkoxides of formula $Al(OR)_3$ in which R is a $C_1$-$C_4$ alkyl radical.

* * * * *